US012444905B2

(12) United States Patent
Fujita

(10) Patent No.: US 12,444,905 B2
(45) Date of Patent: Oct. 14, 2025

(54) COMMUNICATION DEVICE, TERMINAL DEVICE AND ACTIVE OPTICAL CABLE

(71) Applicant: THINE ELECTRONICS, INC., Tokyo (JP)

(72) Inventor: Yusuke Fujita, Tokyo (JP)

(73) Assignee: THINE ELECTRONICS, INC., Tokyo (JP)

( * ) Notice: Subject to any disclaimer, the term of this patent is extended or adjusted under 35 U.S.C. 154(b) by 921 days.

(21) Appl. No.: 17/666,975

(22) Filed: Feb. 8, 2022

(65) Prior Publication Data

US 2022/0255294 A1 Aug. 11, 2022

(30) Foreign Application Priority Data

Feb. 9, 2021 (JP) ................. 2021-018854

(51) Int. Cl.
*H04B 10/40* (2013.01)
*H01S 5/042* (2006.01)
*H01S 5/068* (2006.01)
*H01S 5/0683* (2006.01)
*H04B 10/50* (2013.01)
(Continued)

(52) U.S. Cl.
CPC ........ *H01S 5/0428* (2013.01); *H01S 5/06825* (2013.01); *H01S 5/0683* (2013.01); *H04B 10/40* (2013.01); *H04B 10/50* (2013.01); *H04B 10/503* (2013.01); *H04B 10/60* (2013.01); *H04B 10/69* (2013.01)

(58) Field of Classification Search
CPC .. H01S 5/0428; H01S 5/06825; H01S 5/0683; H04B 10/40; H04B 10/69; H04B 10/502; H04B 10/25; H04B 10/25891; H04B 10/503; H04B 10/50; H04B 10/60; G06F 13/382; G06F 13/385; G06F 13/4282; G02B 6/42
USPC ................ 398/135–139, 140–172, 182–201, 398/202–214
See application file for complete search history.

(56) References Cited

U.S. PATENT DOCUMENTS

| 10,425,161 B2 | 9/2019 | Groepl et al. |
| 2004/0022544 A1* | 2/2004 | Case ...................... H04B 10/40 |
| | | 398/137 |

(Continued)

FOREIGN PATENT DOCUMENTS

| JP | 2017-208838 A | 11/2017 |
| JP | 2020-87142 A | 6/2020 |

OTHER PUBLICATIONS

"Universal Serial Bus 3.2 Specification", 2017 USB 3.0 Promoter Group, Apple Inc et al., Sep. 22, 2017, 548 pages.

*Primary Examiner* — Dibson J Sanchez
(74) *Attorney, Agent, or Firm* — Sughrue Mion, PLLC

(57) ABSTRACT

A communication device includes a controller, a differential input termination resistor, a linear laser driver, transmitted signal detector, a linear transimpedance amplifier, a linear variable gain amplifier, a linear output driver, a pulse counter, a received signal detector, and an amplitude detector. The controller outputs a Term signal for setting a resistance value of the differential input termination resistor, a TxEN signal and an LS signal for controlling an operation of the linear laser driver, an RxEN signal for controlling operations of the linear TIA, the linear VGA, and the linear output driver, and a GCTL signal for controlling a gain of the linear VGA.

8 Claims, 8 Drawing Sheets

(51) Int. Cl.
*H04B 10/60* (2013.01)
*H04B 10/69* (2013.01)

(56) References Cited

U.S. PATENT DOCUMENTS

| | | | | |
|---|---|---|---|---|
| 2005/0095994 | A1* | 5/2005 | Schrodinger | H04B 10/85 455/73 |
| 2005/0213982 | A1* | 9/2005 | Weber | H04B 10/801 398/135 |
| 2005/0271397 | A1* | 12/2005 | Edwards | H04B 10/508 398/198 |
| 2006/0159462 | A1* | 7/2006 | Aronson | H04B 10/2513 398/139 |
| 2006/0257147 | A1* | 11/2006 | Lee | H04B 10/40 398/70 |
| 2006/0285802 | A1 | 12/2006 | Fingler et al. | |
| 2006/0285803 | A1* | 12/2006 | Crews | G02B 6/43 385/88 |
| 2008/0205906 | A1* | 8/2008 | Murata | H03F 3/08 398/208 |
| 2010/0014864 | A1* | 1/2010 | Hong | H04B 10/506 398/79 |
| 2011/0255873 | A1* | 10/2011 | Tang | H04B 10/40 398/136 |
| 2012/0045202 | A1* | 2/2012 | Jiang | H04B 10/40 398/136 |
| 2012/0141132 | A1 | 6/2012 | Walker | |
| 2014/0023374 | A1* | 1/2014 | Yuda | H04J 14/08 372/38.02 |
| 2015/0207568 | A1* | 7/2015 | Ying | H04B 10/801 398/135 |
| 2016/0087723 | A1* | 3/2016 | Zhang | H04B 10/2507 398/140 |
| 2017/0222726 | A1 | 8/2017 | Kubo et al. | |
| 2018/0062749 | A1* | 3/2018 | Rector | H04B 10/07955 |
| 2018/0227057 | A1* | 8/2018 | Kase | G02B 6/42 |
| 2020/0083846 | A1* | 3/2020 | Vera Villarroel | H04B 10/66 |
| 2021/0218472 | A1* | 7/2021 | Latchman | H04B 10/0775 |
| 2021/0226413 | A1* | 7/2021 | Yi | H01S 5/02212 |

* cited by examiner

COMMUNICATION DEVICE, TERMINAL DEVICE AND ACTIVE OPTICAL CABLE

TECHNICAL FIELD

The present invention relates to a communication device, a terminal device, and an active optical cable.

BACKGROUND

A universal serial bus (USB) is one of serial bus standards for connecting a peripheral apparatus to an information apparatus such as a computer. USB is the most widespread general interface standard in current personal computer peripheral apparatuses since USB1.0 which was the first standard appeared in 1996. The USB3.2 standard was officially released in September 2017, and the USB4 standard was officially released in August 2019. USB4 is required to be backward compatible with USB3.2.

A data rate (per lane) of a super speed (SS) signal, which is a main signal, is 5 Gbps in Gen1 of USB3.2, is 10 Gbps in Gen2 of USB3.2, is 10 Gbps in Gen2 of USB4, and is 20 Gbps in Gen3 of USB4. The SS signal is a differential signal(s). Two lanes can be used for communication of the SS signal.

FIG. 1 is a diagram illustrating a configuration in which two apparatuses are connected by a communication cable based on the USB4 standard. A downstream facing port (DFP) and an upstream facing port (UFP) are link partners. The DFP is an apparatus on a host side and is an information apparatus such as a computer. The UFP is an apparatus on a device side and is a peripheral apparatus such as a mouse or a display. A lane adapter is provided in each of the DFP and the UFP, and is a main body of SS signal communication based on USB4. The DFP includes a lane 0 adapter and a lane 1 adapter. The UFP also includes a lane 0 adapter and a lane 1 adapter. The lane 0 and the lane 1 are bonded to each other. These USB lanes can include a differential signal pair for transmission and a differential signal pair for reception. A sideband channel SBC is two wire channels.

The DFP and the UFP are connected to each other by a communication cable. In a case where the communication cable connecting the DFP and the UFP is short, the communication cable may be a passive cable. On the other hand, in a case where the communication cable is long (for example, in a case where a length is equal to or greater than 0.8 m in USB4), the communication cable is required to be an active cable. Examples of the active cable include an active copper cable (ACC) that transmits an electrical signal as it is and an active optical cable (AOC) that converts an electrical signal into an optical signal transmits the optical signal.

The active cable includes an active device. The active device can perform an active operation on a main signal in accordance with a power consumption amount. In the case of the ACC, an active device is a re-driver, a re-timer, or the like that corrects a loss of a signal (particularly, a loss of a high-frequency band). In the case of the AOC, an active device is a laser diode that converts a current signal into an optical signal, a laser driver that supplies a current signal to a laser diode to drive the laser diode, a photodiode that converts an optical signal into a current signal, a transimpedance amplifier (TIA) that converts a current signal output from a photodiode into a voltage signal, or the like.

Signals (main signal, LFPS signal) are transmitted from a communication device on one terminal side in the active cable to a communication device on the other terminal side, and electrical idle information is also transmitted. The low frequency periodic signaling (LFPS) signal is a low speed toggle pattern signal that may be transmitted between lane adapters in order to establish communication between the lane adapters. The cycle time of the LFPS signal is 20 to 100 ns. In the USB3.2 standard, an LFPS signal has at least two cycles. In the USB4 standard, an LFPS signal has at least 16 cycles. A minimum LFPS signal transmission period is 40 ns. An electrical idle (hereinafter, referred to as "EI") is not a voltage at a logic level L or a logic level H of a voltage signal but a voltage at an intermediate level between both these levels.

Patent Document 1 (U.S. Pat. No. 10,425,161) discloses a communication device intended to be used in a terminal of an AOC. In this literature, an optical signal transmitted from a communication device on one terminal side to a communication device on the other terminal side is a signal having the original logic level H and logic level L for a main signal, has a fixed value at a logic level H over an LFPS signal transmission period for an LFPS signal, and has a fixed value at a logic level L over an EI state period for EI information. In addition, an optical signal transmitted from a communication device on one terminal side to a communication device on the other terminal side includes a pulse signal for distinguishing between a timing when transmission of EI information changes to transmission of a main signal and a timing when transmission of EI information changes to transmission of an LFPS signal.

In this literature, the communication device having received the above-mentioned optical signal determines that there is an EI state period when a period for which the received signal is at a logic level L continues. The communication device determines that the EI state period has transitioned to an LFPS signal transmission period when the received signal has transitioned from a logic level L to a logic level H and is then fixed at a logic level H over a fixed period. In addition, the communication device having detected the transition to the LFPS signal transmission period generates an LFPS signal again by a built-in oscillator and outputs the re-generated LFPS signal to a subsequent stage. In this case, the length of a period for which the LFPS signal is output is equal to the length of the LFPS signal transmission period. In addition, when the received signal has transitioned from the logic level L to the logic level H and then includes a predetermined pulse signal, the communication device determines that the EI state period has transitioned to a main signal transmission period, amplifies a received main signal, and outputs the amplified main signal to a latter stage.

Patent Document 1: U.S. Pat. No. 10,425,161

SUMMARY

The inventor has found that the communication device disclosed in Patent Document 1 has the following problem.

The communication device disclosed in this literature includes a first output driver and a second output driver in parallel as paths for outputting an electrical signal on the basis of a received optical signal, the first output driver being a driver for outputting a main signal, and the second output driver being a driver for outputting a re-generated LFPS signal. From this, a load capacity of an output terminal increases, which makes it difficult to output a high speed signal. For example, a data rate (per lane) of a main signal is 20 Gbps in Gen3 of USB4, but it is difficult to output such a high speed signal. Even when only one output driver is provided and a selector for switching a path is provided at a preceding stage of the output driver, a load of an output terminal of the selector is large, which also makes it difficult to increase the speed.

It is thought that such a problem occurs due to the use of a limiting amplifier type as a laser driver and a TIA. The limiting amplifier can output only two values of a logic level H and a logic level L, and cannot output a value of an intermediate level between the logic level H and the logic level L. That is, it is not possible to transmit an optical signal having an intensity corresponding to a voltage at an intermediate level in the case of an EI state.

Consequently, in the invention disclosed in Patent Document 1, an optical signal has a fixed value at a logic level L over an EI state period for EI information. On the other hand, an optical signal has a fixed value at a logic level H over an LFPS signal transmission period for an LFPS signal and transmits only information on the LFPS signal transmission period. Thus, the communication device is required to include a built-in oscillator that re-generates an LFPS signal and a second output driver for outputting the re-generated LFPS signal, in addition to a first output driver for outputting a main signal. In this manner, it is necessary to provide two output drivers in parallel, and thus a load capacity of the output terminal increases, thereby making it difficult to output a high speed signal.

With the intention of solving such a problem, it is conceivable to use a linear amplifier type as a laser driver and a TIA instead of using a limiting amplifier type. The linear amplifier has a substantially linear relationship between an input signal level and an output signal level. Thus, when the linear amplifier type laser driver and a TIA are used, a waveform of an electrical signal can be set as it is to be a waveform of an optical signal on a transmission side in any of a main signal, an LFPS signal, and an EI, and a waveform itself of an optical signal can be set to be a waveform of an electrical signal on a reception side. Thus, the built-in oscillator and the second output driver that are required in the communication device disclosed in Patent Document 1 are not necessary, and only one output driver is required to be provided. As a result, the problem of the communication device disclosed in Patent Document 1 is solved.

However, in a case where a linear amplifier type laser driver and TIA are used, the following different problem occurs. Even in a state where power consumption can be reduced (for example, an Rx.Detect state and a U3 state in a state transition diagram of the USB3.2 standard illustrated in FIG. 2), a situation in which power consumption cannot be reduced (or power consumption is insufficiently reduced) may occur. A state where power consumption can be reduced is basically an EI state. In this case, a laser driver continues to supply a current having an intermediate magnitude to a diode laser, and a photodiode continues to output a current having an intermediate magnitude. As a result, power consumption cannot be reduced regardless of a state where power consumption can be reduced. Meanwhile, FIG. 2 is a state transition diagram of the USB3.2 standard (link training state transition diagram (link training and status state machine (LTSSM)). This is a diagram as described in the standard of USB (Universal Serial Bus 3.2 Specification, Sep. 22, 2017), and thus will be described briefly. When a warm reset is performed or the absence of a far-end receiver termination) ($R_{RX-DC}$) occurs, an inactive state (S1) of an SS signal transitions to an Rx.Detect state (S2). Further, in a case where a power on reset, a warm reset, or a removal has occurred only in a downstream (DS) port, the state transitions to the Rx.Detect state (S2). In a case where the termination of a received signal Rx has been detected, the state transitions to a Polling state (S3). In a state U0 (S4) that has undergone a training sequence from the Polling state (S3), an Enhanced Super Speed link is enabled, and the state U0 (S4) is a state where packet transfer is in progress or a link idle state. The state U0 (S4) can transition from the state U0 to a lower power link state U1 (S5), a lower power link state U2 (S6), and a link suspend state U3 (S7) in which power saving is actively performed in response to respective link commands LGO_U1, LGO_U2, and LGO_U3. In the state U0 (S4), in a case where an error has been detected, the state transitions to a recovery state (S8), and this state can transition to a Hot Reset state (S9), a Lookback state (S10), or the inactive state (S1) of the SS signal. The Polling state (S3) can also transition to a compliance mode state (S11) due to a first LFPS timeout or transition to a disabled state (S12) of an SS signal due to other timeouts or the like. In addition to the timeouts, various conditions such as a handshake are set in advance for the transitions between the states. Further, in a case where a counter (cPolling Timeout) has measured a continuous transition event from a Polling state due to a timeout to an Rx.Detect state only in the downstream (DS) port, the Polling state (S3) transitions to the inactive state (S1) of the SS signal. In a case where the received signal Rx has exceeded a limit only in an upstream (US) port, the Rx.Detect state (S2) transitions to the disabled state (S12) of the SS signal.

In a case where an EI state is detected and power is reduced even when the linear amplifier type laser driver and TIA are used, power consumption can be reduced. However, the length of the LFPS signal transmission period included in the EI state period is reduced, which may result in a failure in the establishment of communication. That is, the transition from the EI state period to the LFPS signal transmission period not only takes a long period of time but also has a large variation of a required time. On the other hand, the transition from the LFPS signal transmission period to the EI state period can be performed in a short period of time. Thus, when power is reduced whenever an EI state is detected, the length of the LFPS signal transmission period is reduced, which may result in a failure in the establishment of communication.

The present invention is contrived in order to solve the above-mentioned problem, and an object thereof is to provide a communication device which is provided on a first terminal side or a second terminal side in an active optical cable (AOC) that performs communication between the first terminal side and the second terminal side and is capable of performing high speed communication and reducing power consumption. In addition, an object of the present invention is to provide a terminal device including such a communication device, and the active optical cable (AOC).

The communication device is a communication device which is provided on a first terminal side or a second terminal side in an active optical cable configured to perform communication between the first terminal side and the second terminal side by using a laser diode and a photodiode respectively provided on the first terminal side and the second terminal side.

The communication device includes (1) a differential input termination resistor configured to terminate differential input terminals to which a signal to be transmitted to the other party communication device side is input as differential signals, and has a variable resistance value, (2) a linear laser driver configured to supply a current signal to the laser diode based on a signal to be transmitted to the other party communication device side and output an optical signal from the laser diode, (3) a transmitted signal detector configured to detect whether or not an input signal for the differential input terminals is an electrical idle, (4) a linear transimpedance amplifier configured to input a current signal output from the photodiode having received an optical signal having arrived from the other party communication device side, convert the current signal into a voltage signal, and output the voltage signal, (5) a linear variable gain amplifier configured to amplify and outputs the voltage signal output from the linear transimpedance amplifier, (6) a linear output driver configured to output the voltage signal output from the linear variable gain amplifier to an output destination device and is able to detect an input termination resistance of the output destination device, (7) a pulse counter configured to monitor the current signal output from the photodiode or the voltage signal output from the linear transimpedance amplifier, and detect the number of pulses of the current signal or the voltage signal, (8) a received signal detector configured to monitor the current signal output from the photodiode or the voltage signal output from the linear transimpedance amplifier, and detect whether or not the current signal or the voltage signal is an electrical idle, and (9) a controller configured to control a transition between an active state in which a signal is able to be transmitted and a sleep state in which power consumption is able to be reduced, based on an electrical idle detection result obtained by the transmitted signal detector, an output destination device input termination resistance detection result obtained by the linear output driver, a pulse number detection result obtained by the pulse counter, and an electrical idle detection result obtained by the received signal detector, and controls operations of the differential input termination resistor, the linear laser driver, the linear transimpedance amplifier, the linear variable gain amplifier, and the linear output driver.

The controller (a) determines a transition from a sleep state to an active state when the transmitted signal detector has detected that the input signal is not an electrical idle or when the number of pulses detected by the pulse counter indicates a transition from the sleep state to the active state, (b) determines a transition from the active state to the sleep state, based on a fact that the transmitted signal detector has detected that the input signal is an electrical idle or a fact that the received signal detector has detected that the current signal or the voltage signal is an electrical idle, (c) controls supply of the current signal to the laser diode by the linear laser driver, based on the output destination device input termination resistance detection result obtained by the linear output driver, and whether it is the active state or the sleep state, (d) controls a resistance value of the differential input termination resistor based on the pulse number detection result obtained by the pulse counter, and (e) controls operations of the linear transimpedance amplifier, the linear variable gain amplifier, and the linear output driver, based on whether being in the active state or the sleep state.

It is preferable that the communication device further include an amplitude detector configured to detect an amplitude of the voltage signal output from the linear variable gain amplifier, in which the controller controls a gain of the linear variable gain amplifier based on an amplitude detection result obtained by the amplitude detector.

In the communication device, It is preferable that the linear laser driver include a low speed driver and a high speed driver, the low speed driver supplying a current signal to the laser diode based on a control signal received from the controller, and the high speed driver supplying a current signal to the laser diode based on an input signal for the differential input terminals, and in this case, it is preferable that the controller control supply of the current signal to the laser diode by the low speed driver, based on the output destination device input termination resistance detection result obtained by the linear output driver and whether it is the active state or the sleep state, and control supply of the current signal to the laser diode by the high speed driver, based on whether it is the active state or the sleep state.

In the communication device, it is preferable that the controller make the number of pulses of the current signal to be supplied from the linear laser driver to the laser diode vary in a case where the output destination device input termination resistance detection result obtained by the linear output driver is a high impedance, in a case where the output destination device input termination resistance detection result obtained by the linear output driver is a low impedance, and in a case where a transition from the sleep state to the active state is performed.

In the communication device, it is preferable that controller determine a transition from the active state to the sleep state when the transmitted signal detector has detected that the input signal is an electrical idle over a fixed period or when the received signal detector has detected that the current signal or the voltage signal is an electrical idle over a fixed period. In this case, it is preferable that a length of the fixed period be 240 ms or more.

A terminal device includes the above-mentioned communication device, a laser diode configured to input a current signal supplied from a linear laser driver of the communication device and output an optical signal to the other party communication device side, and a photodiode configured to receive an optical signal having arrived from the other party communication device side and output a current signal to a linear transimpedance amplifier of the communication device.

An active optical cable includes a first terminal device and a second terminal device which are the above-mentioned terminal device, a first optical fiber configured to guide an optical signal output from a laser diode of the first terminal device to a photodiode of the second terminal device, and a second optical fiber configured to guide an optical signal output from a laser diode of the second terminal device to a photodiode of the first terminal device.

A communication device provided in an active optical cable includes a variable resistor which is connected between differential input terminals of a linear laser driver, a transmitted signal detector which is connected to the differential input terminals, a linear transimpedance amplifier which is connected to a photodiode, a linear variable gain amplifier which is connected to an output terminal of the linear transimpedance amplifier, a linear output driver which is connected to an output terminal of the linear variable gain amplifier, a pulse counter which is connected to the photodiode, a received signal detector which is connected to an output terminal of the linear transimpedance amplifier, and a controller which includes a plurality of input terminals and a plurality of output terminals, the controller being configured such that the input terminals of the controller are connected to an output terminal of the pulse counter and an output terminal of the received signal detector, and the output terminals of the controller are connected to a resistance value control terminal of the variable resistor, a control signal input terminal of the linear laser driver, a control signal input terminal of the linear transimpedance amplifier, and a control signal input terminal of the linear variable gain amplifier.

In an active optical cable (AOC) that performs communication between a first terminal side and a second terminal side, high speed communication and power consumption can be reduced.

DETAILED DESCRIPTION

Figure 1:
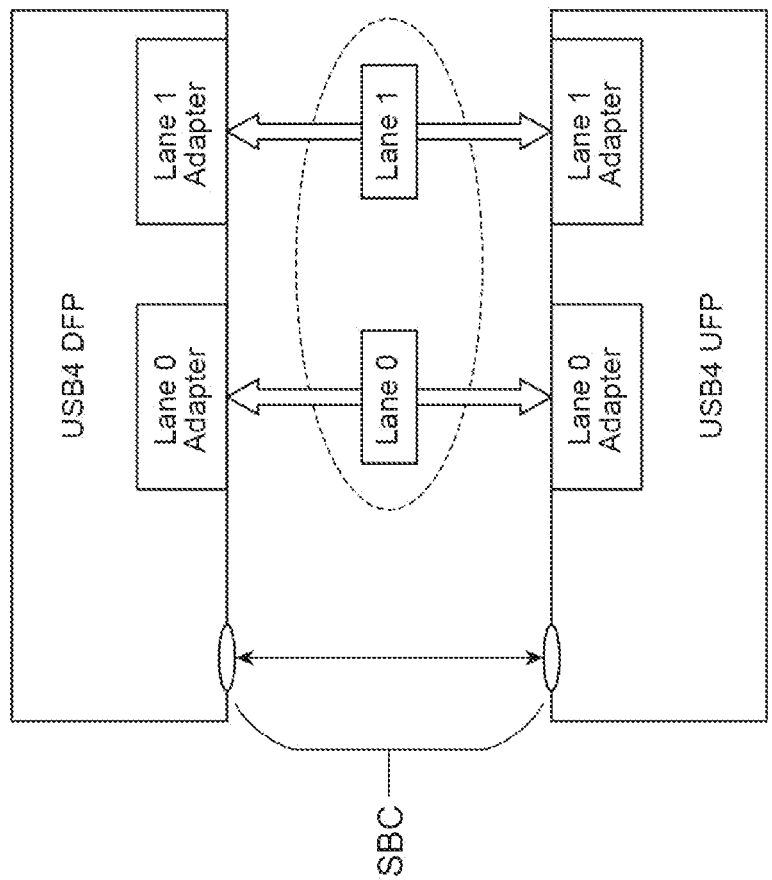
FIG. 1 is a diagram illustrating a configuration in which two apparatuses are connected by a communication cable based on a USB4 standard.

Hereinafter, a mode for carrying out the present invention will be described in detail with reference to the accompanying drawings. Meanwhile, the same components in the description of the drawings are denoted by the same reference numerals and signs, and repeated description will be omitted. The present invention is not limited to these examples, is indicated by the scope of claims, and is intended to include all modifications within the meaning and scope equivalent to the scope of claims.

Figure 3:
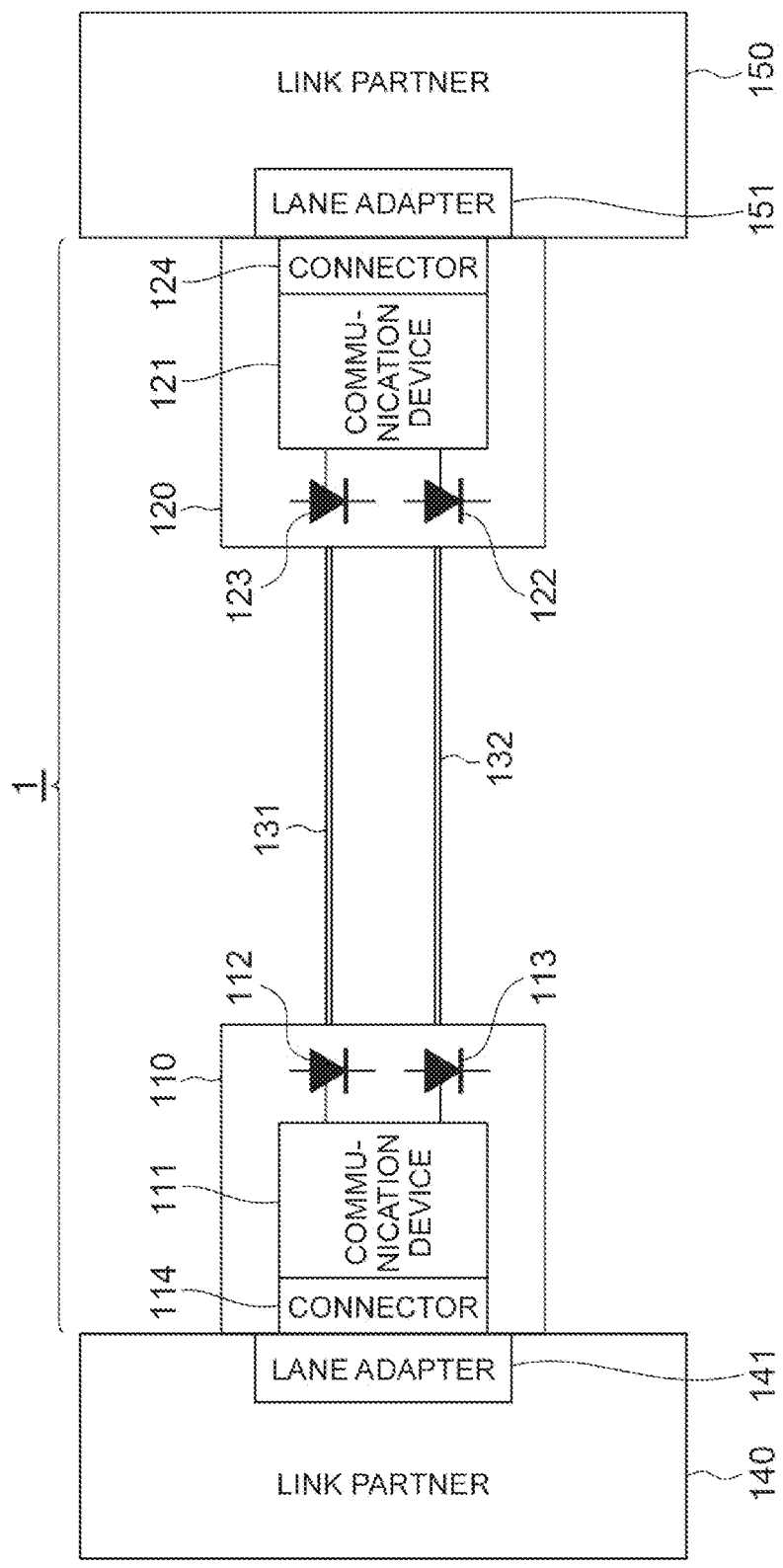
FIG. 3 is a diagram illustrating a configuration of an active optical cable (AOC) 1.

FIG. 3 is a diagram illustrating a configuration of an active optical cable (AOC) 1. The AOC 1 performs communication between a lane adapter 141 of one link partner 140 and a lane adapter 151 of the other link partner 150. The lane adapter 141 and the lane adapter 151 may be based on a USB3.2 standard or a USB4 standard. The AOC 1 performs communication between a first terminal side and a second terminal side by using a laser diode and a photodiode that are respectively provided on the first terminal side and the second terminal side.

A terminal device 110 provided on the first terminal side of the AOC 1 includes a communication device 111, a laser diode 112, a photodiode 113, and a connector 114. The connector 114 is connected to a lane adapter 141. A terminal device 120 provided on the second terminal side of the AOC 1 includes a communication device 121, a laser diode 122, a photodiode 123, and a connector 124. The connector 124 is connected to the lane adapter 151. An optical fiber 131 that transmits an optical signal is provided between the laser diode 112 and the photodiode 123. An optical fiber 132 that transmits an optical signal is provided between the laser diode 122 and the photodiode 113.

Figure 4:
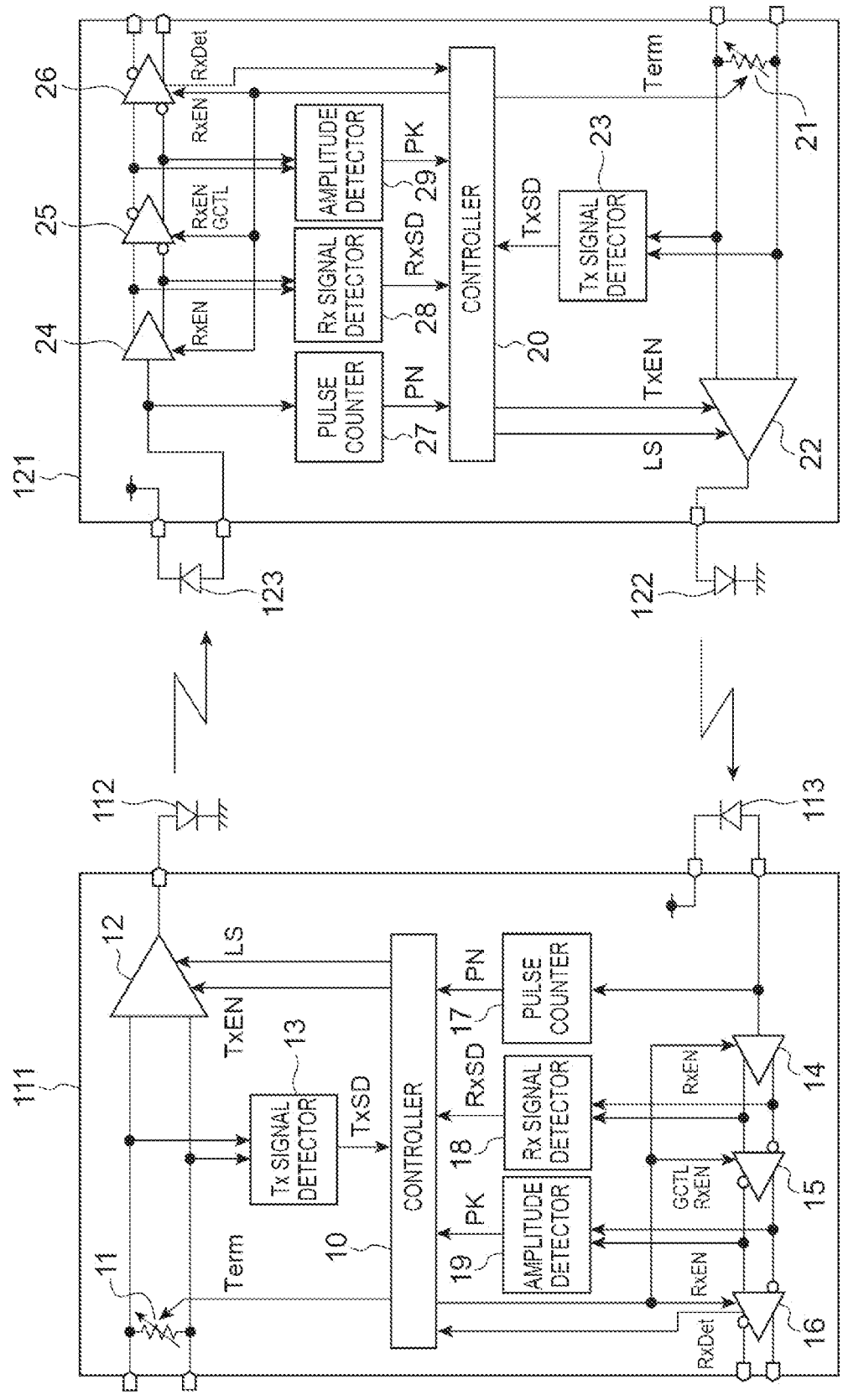
FIG. 4 is a diagram illustrating configurations of a communication device 111 and a communication device 121.

FIG. 4 is a diagram illustrating configurations of the communication device 111 and the communication device 121. The communication device 111 includes a controller 10, a differential input termination resistor 11, a linear laser driver 12, a transmitted signal detector 13, a linear transimpedance amplifier (linear TIA) 14, a linear variable gain amplifier (linear VGA) 15, a linear output driver 16, a pulse counter 17, a received signal detector 18, and an amplitude detector 19. The communication device 121 includes a controller 20, a differential input termination resistor 21, a linear laser driver 22, a transmitted signal detector 23, a linear transimpedance amplifier (linear TIA) 24, a linear variable gain amplifier (linear VGA) 25, a linear output driver 26, a pulse counter 27, a received signal detector 28, and an amplitude detector 29. The communication device 111 and the communication device 121 have the same configuration, and components having the same names have the same functions. Hereinafter, the communication device 111 will be mainly described.

The differential input termination resistor 11 terminates differential input terminals, a signal to be transmitted to the communication device 121 side of the other party inputting to the differential input terminals as differential signals from the lane adapter 141. A resistance value of the differential input termination resistor 11 is variable and is set by a control signal given from the controller 10.

The linear laser driver 12 supplies a current signal to the laser diode 112 on the basis of a signal to be transmitted to the communication device 121 side of the other party and outputs an optical signal from the laser diode 112. The linear laser driver 12 is a linear amplifier type, and a relationship between a voltage signal level which is input and a current signal level which is output is substantially linear. An operation of the linear laser driver 12 is controlled by a control signal given from the controller 10. The linear laser driver 12 may supply a current signal to the laser diode 112 on the basis of a control signal given from the controller 10, in addition to supplying a current signal to the laser diode 112 on the basis of a signal which is input from the lane adapter 141.

The transmitted signal detector 13 monitors an input signal for the differential input terminals, detects whether or not the input signal is an EI, and transmits a TxSD signal indicating the detection result to the controller 10. The transmitted signal detector 13 may monitor a signal inside the linear laser driver 12.

A linear TIA 14 inputs a current signal output from the photodiode 113 having received an optical signal having arrived from the communication device 121 side of the other party, converts the current signal into a voltage signal, and outputs the voltage signal to a linear VGA 15. The linear TIA 14 is a linear amplifier type, and a relationship between a current signal level which is input and a voltage signal level which is output is substantially linear. An operation of the linear TIA 14 is controlled by a control signal given from the controller 10.

The linear VGA 15 amplifies the voltage signal which is output from the linear TIA 14 and outputs the amplified voltage signal to the linear output driver 16. A gain of the linear VGA 15 is variable and is set by a control signal given from the controller 10. The linear VGA 15 is a linear amplifier type, and a relationship between a voltage signal level which is input and a voltage signal level which is output is substantially linear. An operation of the linear VGA 15 is controlled by a control signal given from the controller 10.

The linear output driver 16 outputs the voltage signal output from the linear VGA 15 to an output destination device (lane adapter 141). The linear output driver 16 may amplify the input voltage signal with a fixed gain and output the amplified voltage signal. The linear output driver 16 is a linear amplifier type, and a relationship between a voltage signal level which is input and a voltage signal level which is output is substantially linear when the gain is fixed. An operation of the linear output driver 16 is controlled by a control signal given from the controller 10.

In addition, the linear output driver 16 can detect an input termination resistance of an output destination device (lane adapter 141), and transmits an RxDet signal indicating the detection result to the controller 10. The input termination resistance of the output destination device can be detected, for example, by detecting a response speed of a potential change when a pulse signal is output to the output destination device. When input termination of the output destination device is in an off state, a response speed is high. When input termination of the output destination device is in an on state, a response speed is low. An input termination resistance of the output destination device can be detected by the linear output driver 16 even when the linear output driver 16 is in a power-down state.

The pulse counter 17 monitors a current signal output from the photodiode 113 or a voltage signal output from the linear TIA 14, detects the number of pulses of the current signal or the voltage signal, and transmits a PN signal indicating the detection result to the controller 10. The pulse counter 17 may monitor any one of the current signal output from the photodiode 113, the voltage signal output from the linear TIA 14, the voltage signal output from the linear VGA 15, and the voltage signal output from the linear output driver 16. As illustrated in the drawing, it is preferable that the pulse counter 17 monitor the current signal output from the photodiode 113. The pulse counter 17 monitors the current signal output from the photodiode 113, and thus it is possible to reduce power of all circuits after the linear TIA 14.

The received signal detector 18 monitors the current signal output from the photodiode 113 or the voltage signal output from the linear TIA 14, detects whether or not the current signal or the voltage signal is an EI, and transmits an RxSD signal indicating the detection result to the controller 10. The received signal detector 18 may monitor any one of the current signal output from the photodiode 113, the voltage signal output from the linear TIA 14, the voltage signal output from the linear VGA 15, and the voltage signal output from the linear output driver 16. As illustrated in the drawing, it is preferable that the received signal detector 18 be provided at a stage before the linear VGA 15. The received signal detector 18 monitors a voltage signal or a current signal of the stage before the linear VGA 15, and thus it is possible to detect whether the voltage signal or the current signal is an EI regardless of a gain of the linear VGA 15.

The amplitude detector 19 detects an amplitude of the voltage signal output from the linear VGA 15, and transmits a PK signal indicating the detection result to the controller 10. The amplitude detector 19 may monitor the voltage signal output from the linear output driver 16, but in this case, it is not preferable in that an output load capacity increases, and a return loss deteriorates. As illustrated in the drawing, it is preferable that the amplitude detector 19 monitor the voltage signal output from the linear VGA 15. In addition, it is preferable that the amplitude detector 19 detect an average value of amplitudes of voltage signals over a certain fixed period.

The controller 10 inputs a TxSD signal indicating an EI detection result output from the transmitted signal detector 13, an RxDet signal indicating an output destination device input termination resistance detection result output from the linear output driver 16, a PN signal indicating a pulse number detection result output from the pulse counter 17, an RxSD signal indicating an EI detection result output from the received signal detector 18, and a PK signal indicating an amplitude detection result output from the amplitude detector 19. The controller 10 controls a transition between an active state in which a signal can be transmitted and a sleep state in which power consumption can be reduced, on the basis of the input TxSD signal, RxDet signal, PN signal, RxSD signal, and PK signal.

In addition, the controller 10 outputs a Term signal for setting a resistance value of the differential input termination resistor 11, a TxEN signal and an LS signal for controlling an operation of the linear laser driver 12, an RxEN signal for controlling operations of the linear TIA 14, the linear VGA 15, and the linear output driver 16, and a GCTL signal for controlling a gain of the linear VGA 15, on the basis of the input signals.

Figure 5:
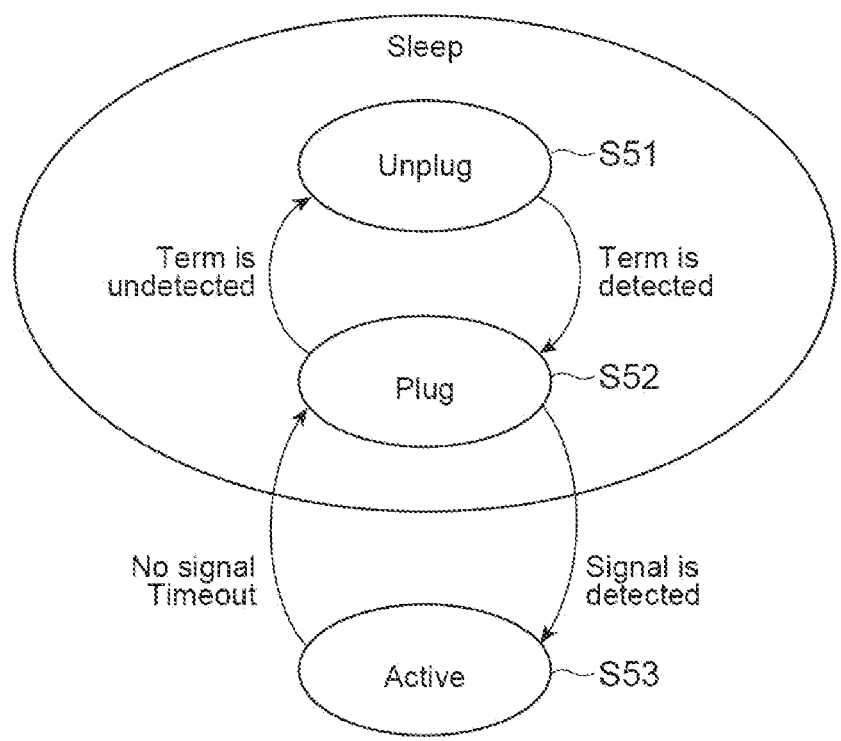
FIG. 5 is a state transition diagram illustrating a transition between an active state and a sleep state.

FIG. 5 is a state transition diagram illustrating a transition between an active (Active) state (S53) and a sleep (Sleep) state. The active state (S53) is a state in which a signal can be transmitted. The sleep state is a state where power consumption can be reduced. The sleep state includes an unplug (Unplug) state (S51) and a plug (Plug) state (S52).

A transition between the unplug state (S51) and the plug state (S52) is performed on the basis of the output destination device input termination resistance detection result indicating the RxDet signal output from the linear output driver 16. That is, when an output destination device is connected, the state transitions to the plug state (S52), and when an output destination device is not connected, the state transitions to the unplug state (S51). In addition, a transition between the plug state (S52) and the active state (S53) is performed on the basis of the EI detection result indicated by the TxSD signal output from the transmitted signal detector 13, the pulse number detection result indicated by the PN signal output from the pulse counter 17, and the EI detection result indicated by the RxSD signal output from the received signal detector 18.

The states in the state transition diagram illustrated in FIG. 5 and the sates in the state transition diagram of the USB3.2 standard illustrated in FIG. 2 correspond to each other as follows. The unplug state includes the states of SS.Disabled and Rx.Detect (termination off) in the state transition diagram of the USB3.2 standard illustrated in FIG. 2. The plug state (S52) includes the states of Rx Detect (termination on), U2, U3, and SS.Inactive in the state transition diagram of the USB3.2 standard illustrated in FIG. 2. The active state (S53) includes the sates of Polling, U0, U1, and Recovery in the state transition diagram of the USB3.2 standard illustrated in FIG. 2.

The controller 10 determines a transition from a sleep state to an active state on the basis of the TxSD signal or the PN signal. That is, when the transmitted signal detector 13 has detected that an input signal is not an EI or the pulse number detected by the pulse counter 17 indicates a transition from the sleep state to the active state (S53), the controller 10 determines a transition from the sleep state to the active state (S53).

The controller 10 determines a transition from the active state (S53) to the sleep state on the basis of the TxSD signal or the RxSD signal. That is, the controller 10 determines a transition from the active state (S53) to the sleep state on the basis of the transmitted signal detector 13 having detected that an input signal is an EI or the received signal detector 18 having detected that the current signal or the voltage signal is an EI.

Preferably, the controller 10 determines a transition from the active state (S53) to the sleep state when the transmitted signal detector 13 has detected that an input signal is an EI over a fixed period or the received signal detector 18 has detected that the current signal or the voltage signal is an EI over a fixed period. The length of the fixed period mentioned herein is preferably 240 ms or more.

The controller 10 controls the supply of a current signal to the laser diode 112 by the linear laser driver 12 in response to a TxEN signal, and an LS signal that are given to the linear laser driver 12, on the basis of an RxDet signal and a state (any of an active state or a sleep state). That is, the controller 10 controls the supply of a current signal to the laser diode 112 by the linear laser driver 12 on the basis of a detection result of an output destination device input termination resistance by the linear output driver 16 and any of an active state or a sleep state.

Specifically, the controller 10 makes a pulse number of a current signal to be supplied from the linear laser driver 12 to the laser diode 112 vary in a case where the detection result of the output destination device input termination resistance by the linear output driver 16 is a high impedance, in a case where the detection result of the output destination device input termination resistance by the linear output driver 16 is a low impedance, and in a case where a transition from a sleep state to an active state is performed, in response to an LS signal to be given to the linear output driver 16. In addition, the controller 10 switches between validness and non-validness of an input of an electrical signal from differential input terminals in response to a TxEN signal to be given to the linear output driver 16, and makes the input of the electrical signal from the differential input terminals non-valid for a period in which a pulse signal is output in response to an LS signal. In addition, the controller 10 stops the supply of a current signal from the linear laser driver 12 to the laser diode 112 in the case of a sleep state.

The number of pulses instructed by an LS signal is the number of pulses repeated with a fixed pulse width at fixed pitches for a fixed period with a timing when a logic level L continues over a certain period and then transitions to a logic level H as a starting point. The number of pulses may be 1, and in this case, it means that there is only one pulse of having a fixed pulse width for a fixed period with a timing when a logic level L continues for a certain period and then transitions to a logic level H as a starting point. In addition, the number of pulses may be 0, and in this case, it means that a logic level L continues over a predetermined period of time or more. The pulse counter 17 detects the number of pulses on the basis of these matters.

The controller 10 controls a resistance value of the differential input termination resistor 11 in response to a Term signal given to the differential input termination resistor 11 on the basis of a PN signal. That is, the controller 10 acquires information of an input termination resistance of an output destination device (lane adapter 151) detected by the linear output driver 26 of the communication device 121 of the other party on the basis of a pulse number detection result of the pulse counter 17, and controls a resistance value of the differential input termination resistor 11 on the basis of the information.

Specifically, the controller 10 sets the differential input termination resistor 11 to be a high impedance when the input termination resistance of the output destination device (lane adapter 151) in the communication device 121 of the other party is a high impedance, and sets the differential input termination resistor 11 to be a low impedance when the input termination resistance of the output destination device (lane adapter 151) in the communication device 121 of the other party is a low impedance. The lane adapter 141 can detect an on state/off state of the input termination resistance of the lane adapter 151 of the other party by detecting a resistance value of the differential input termination resistor 11.

In this manner, an output destination device input termination resistance detection result of the linear output driver 26 of the communication device 121 of the other party is transmitted as a pulse of an optical signal from the laser diode 122 driven by the linear laser driver 22 of the communication device 121 of the other party, and the optical signal is received by the photodiode 113. In addition, the magnitude of impedance of the differential input termination resistor 11 is set in accordance with the impedance of the input termination resistance of the output destination device (lane adapter 151) in the communication device 121 of the other party, on the basis of a pulse number detection result obtained by the pulse counter 17 to which a current signal output from the photodiode 113 has been input. Such a function is referred to as an RxDetect function. In addition, communication based on the optical signal of the output destination device input termination resistance detection result of the linear output driver 26 of the communication device 121 of the other party is referred to as RxDetect communication.

The controller 10 controls an operation of each of the linear TIA 14, the linear VGA 15, and the linear output driver 16 by outputting an RxEN signal on the basis of which state out of an active state or a sleep state the state is. Specifically, the controller 10 reduces or stops power to be supplied to the linear TIA 14, the linear VGA 15, and the linear output driver 16 in the case of a sleep state to reduce power consumption.

The controller 10 controls a gain of the linear VGA 15 in response to a GCTL signal given to the linear VGA 15 on the basis of a PK signal. Specifically, the controller 10 controls a gain of the linear VGA 15 so that an amplitude of a voltage signal output from the linear VGA 15 falls within a target value or a target range, on the basis of an amplitude detection result obtained by the amplitude detector 19.

Figure 8:
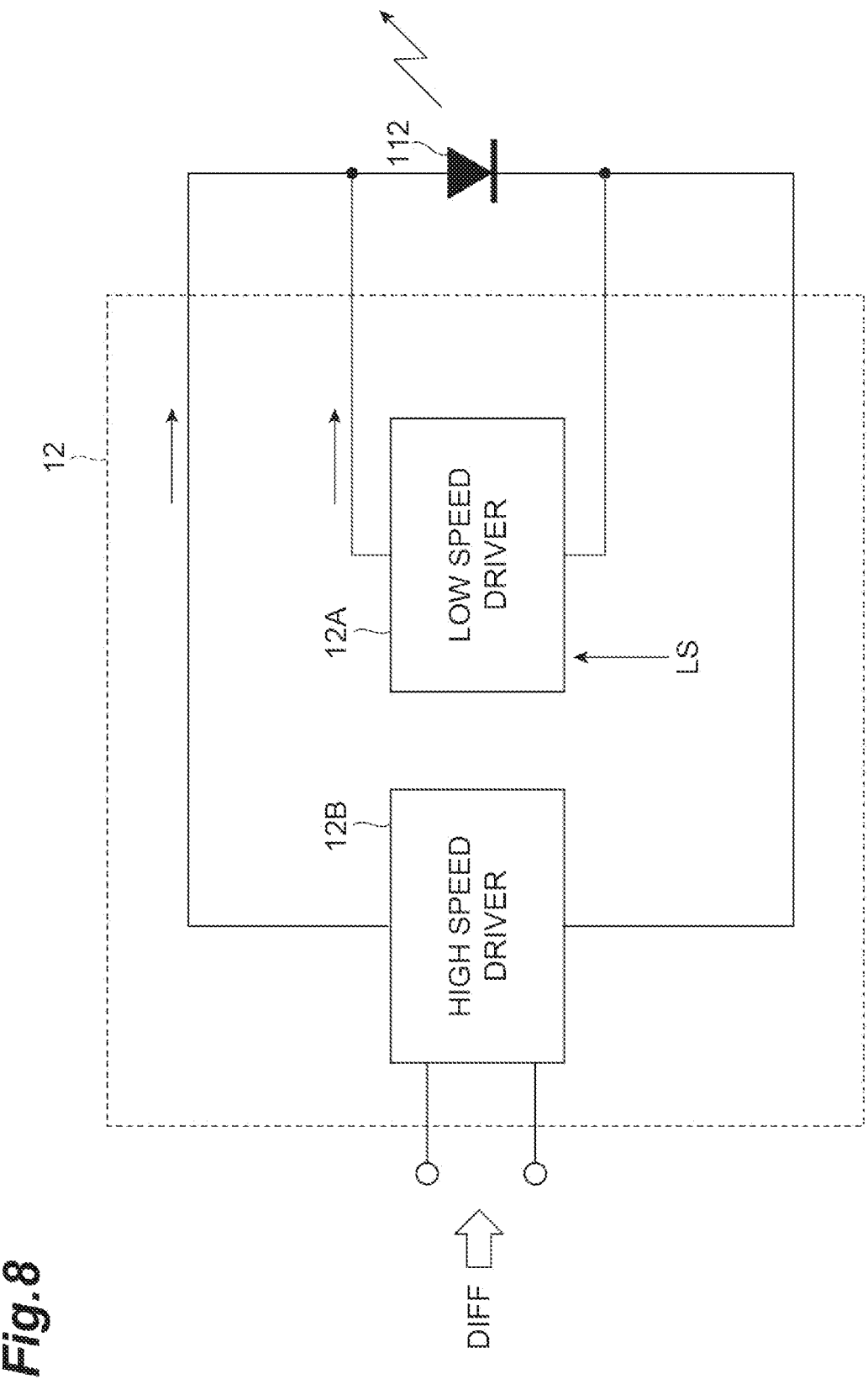
FIG. 8 is a diagram illustrating an example of a linear laser driver 12.

Meanwhile, as illustrated in FIG. 8, the linear laser driver 12 may be configured to include a low speed driver 12A and a high speed driver 12B which are provided in parallel, the low speed driver 12A supplying a current signal to the laser diode 112 on the basis of an LS signal received from the controller 10, and the high speed driver 12B supplying a current signal to the laser diode 112 on the basis of a differential signal(s) DIFF which is input to differential input terminals. The LS signal is input to the low speed driver 12A, and the differential signal DIFF given to both ends of the differential input termination resistor 11 is input to the high speed driver 12B. In this case, the controller 10 controls the supply of a current signal to the laser diode 112 by the low speed driver 12A, on the basis of the detection result of the output destination device input termination resistance by the linear output driver 16 and which state out of an active state or a sleep state the state is. In addition, the controller 10 controls the supply of a current signal to the laser diode 112 by the high speed driver 12B on the basis of which state out of an active state or a sleep state the state is. The high speed driver 12B may be a linear amplifier type, and the low speed driver 12A may be a limiting amplifier type. Meanwhile, the description of the low speed driver 12A and the high speed driver 12B in one communication device 111 can be read as the description of the low speed driver and the high speed driver of the other communication device 121.

In the present embodiment, when RxDetect communication is performed, an optical signal including predetermined pulse information is transmitted. The RxDetect communication is performed in a sleep state. When input termination of the output destination device (lane adapter 151) in the communication device 121 of the other party is in an on state, an unplug state transitions to a plug state by the RxDetect communication. When the input termination of the output destination device (lane adapter 151) in the communication device 121 of the other party is in an off state, a plug state transitions to an unplug state.

In a sleep state including the unplug state (S51) and the plug state (S52), an input of a signal, which is input to the differential input terminals, to the linear laser driver 12 is set to be non-valid in response to a TxEN signal given to the linear laser driver 12 from the controller 10. In addition, a current supplied to the laser diode 112 from the linear laser driver 12 can be set to approximately 0 mA in response to an LS signal given to the linear laser driver 12 from the controller 10. The RxDetect communication is performed on the basis of the LS signal in accordance with the output destination device input termination resistance detection result (Rx Detect result) obtained by the linear output driver 16 which is performed at a fixed cycle.

In a sleep state, the power of the linear TIA 14, the linear VGA 15, and the linear output driver 16 can be reduced in response to an RxEN signal output from the controller 10. In this case, the linear output driver 16 can generate and output an EI potential. The linear output driver 16 can generate an EI potential even in a power-down state and can also perform RxDetect. The pulse counter 17 detects the number of pulses transmitted by the RxDetect communication, and the controller 10 can set a resistance value of the differential input termination resistor 11 on the basis of the pulse number detection result.

Switching between normal communication (communication of a main signal or an LFPS signal) and the RxDetect communication is performed in response to an optical signal including pulse information. In a sleep state, when the transmitted signal detector 13 has detected an input of a signal or when a pulse number detection result obtained by the pulse counter 17 indicates a transition to an active state, the sleep state transitions to the active state.

When the sleep state transitions to the active state, an input of a signal to the linear laser driver 12 is validated in response to a TxEN signal given to the linear laser driver 12 from the controller 10. The linear TIA 14, the linear VGA 15, and the linear output driver 16 are started up in response to an RxEN signal output from the controller 10. In addition, a gain of the linear VGA 15 is controlled in response to a GCTL signal given to the linear VGA 15 from the controller 10. Meanwhile, the linear output driver 16 may be started up before or after the control of a gain of the linear VGA 15 is completed.

Figure 2:
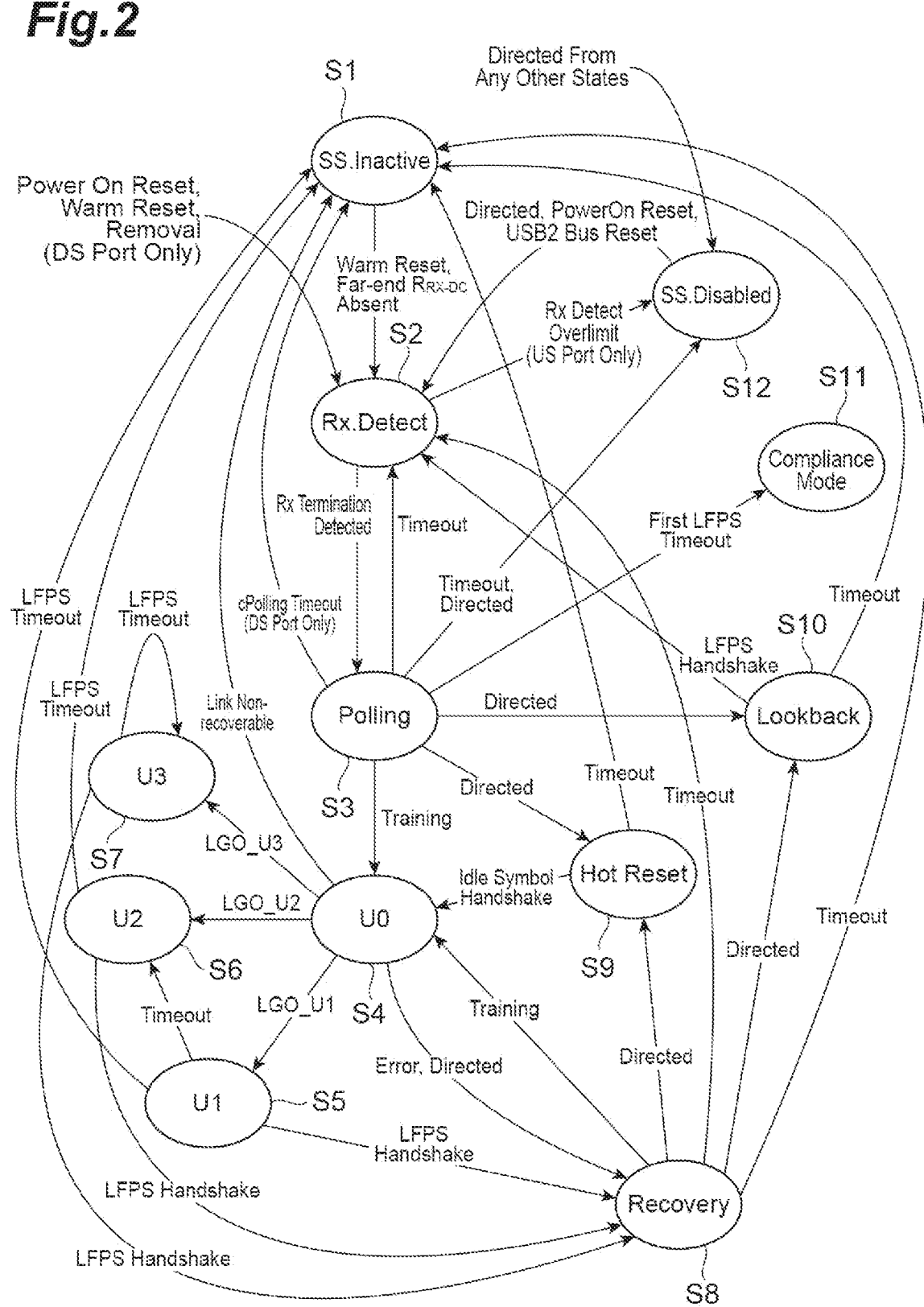
FIG. 2 is a state transition diagram of a USB3.2 standard.

EI information can be transmitted at an intermediate level through linear communication until the state returns to a state in which power consumption can be reduced (for example, the RxDetect state or the U3 state in the state transition diagram of the USB3.2 standard illustrated in FIG. 2). When the received signal detector 18 detects an EI, the controller 10 stops to control a gain of the linear VGA 15. When a signal is not received for a while after the detection of an EI by the received signal detector 18 or the detection of an EI by the transmitted signal detector 13, an active state transitions to a sleep state. When a signal is detected by the received signal detector 18 or a signal is detected by the transmitted signal detector 13, the state is maintained at an active state.

According to the present embodiment, the following effects are obtained. The AOC 1 including the communication devices 111 and 121 and the like can perform an RxDetect function, and can cope with both the USB3.2 standard and the USB4 standard. However, the present invention is not limited to coping with the USB3.2 standard and the USB4 standard.

In the communication device disclosed in the above Patent Document 1, two output drivers provided in parallel are required, while one linear output driver 16 is only required to be provided as an output driver in the present embodiment. Thus, in the present embodiment, an increase in the load capacity of an output terminal is suppressed, it is easy to output a high speed signal, and it is also possible to cope with 20 Gbps which is a data rate (per lane) of a main signal in Gen3 of USB4.

In the present embodiment, in a sleep state, the linear laser driver 12 is basically in a non-valid state for an input signal, has an output current of 0 mA, and outputs a current signal only during RxDetect communication. Further, in a sleep state, the linear TIA 14, the linear VGA 15, and the linear output driver 16 are in a power-down state and can be maintained in a minimum power consumption state as much as possible. Thus, in the present embodiment, in the RxDetect state and the U3 state in the state transition diagram of the USB3.2 standard illustrated in FIG. 2, power consumption can be reduced. Even when RxDetect information is transmitted in response to a pulse signal, it is not necessary to start a signal path every time, and low power consumption can be maintained.

As illustrated in the state transition diagram of the USB3.2 standard illustrated in FIG. 2, first, an Rx.Detect state is set after power is supplied, the state transitions to a Polling state after a termination on state is detected in the Rx.Detect state, and the state transitions to a U0 state which is an active state after a procedure in the Polling state is successful. It does not matter if a first part of an LFPS signal transmission period after the Polling state transition is lost. This will be described below.

Figure 6:
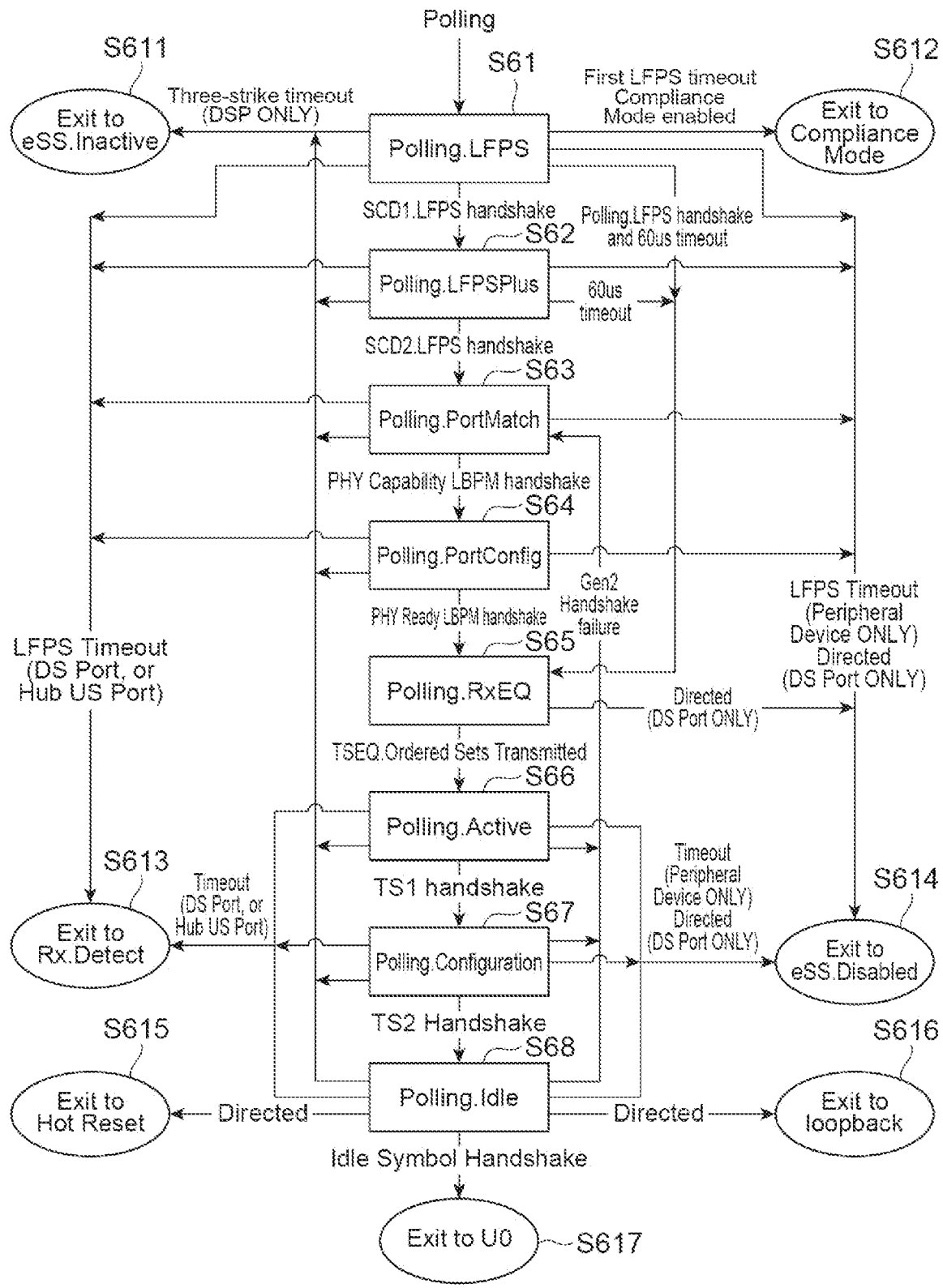
FIG. 6 is a state transition diagram of a Polling state in the state transition diagram of the USB3.2 standard illustrated in FIG. 2.

FIG. 6 is a state transition diagram of the Polling state in the state transition diagram of the USB3.2 standard illustrated in FIG. 2. This is a diagram as described in the standard of USB (Universal Serial Bus 3.2 Specification, Sep. 22, 2017), and thus will be described briefly. Meanwhile, FIG. 7 is a diagram illustrating transmission and reception of a signal between two link partners in the Polling state illustrated in FIG. 6, a communication sequence of one link partner (communication device 111 side) is illustrated on the left side, and a communication sequence of the other link partner (communication device 121 side) is illustrated on the right side.

Figure 7:
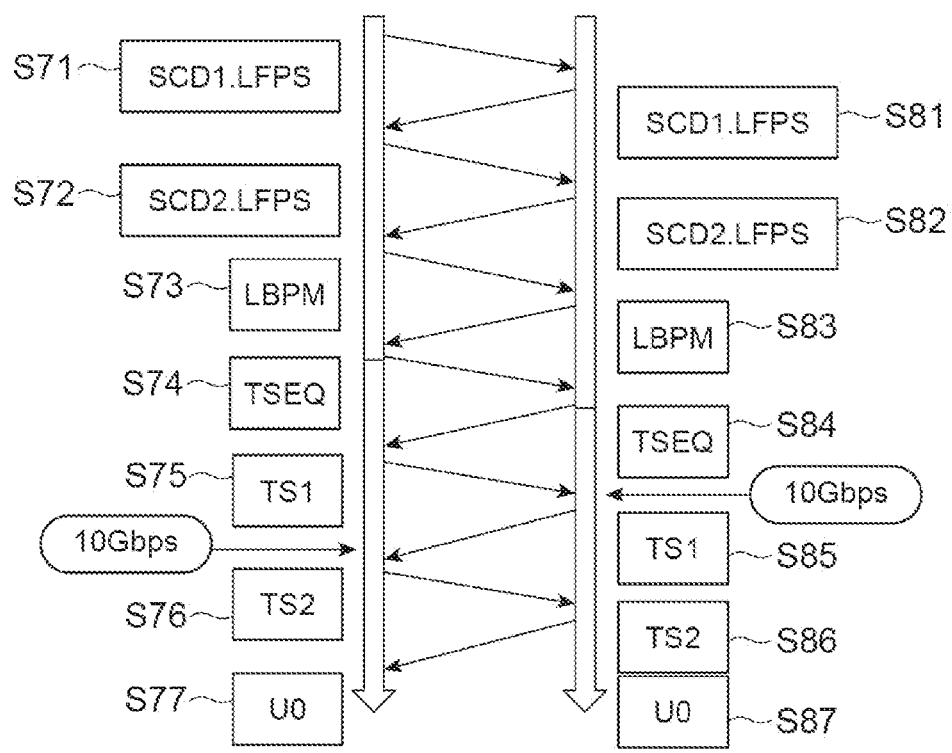
FIG. 7 is a diagram illustrating transmission and reception of a signal between two link partners in the Polling state illustrated in FIG. 6.

As illustrated in FIG. 7, first, in order to perform establishment of communication, an SCD1.LFPS signal is transmitted from a first link partner to a second link partner (S71) (Handshake). SCD is an abbreviation for "SS Capability Declaration", SCD1 is a signal indicating "0010", and the SCD1.LFPS signal indicates an SCD1 signal in LFPS. Next, the SCD1.LFPS signal is transmitted to the first link partner from the second link partner having received the signal (S81) (Handshake). Subsequently, an SCD2.LFPS signal is transmitted to the second link partner from the first link partner having received the signal (S72) (Handshake). Meanwhile, SCD2 is a signal indicating "1101", and the SCD2.LFPS signal indicates an SCD2 signal in LFPS. Next, the SCD2.LFPS signal is transmitted to the first link partner from the second link partner having received the signal (S82) (Handshake). Next, an LBPM signal is transmitted to the second link partner from the first link partner having received the signal (S73) (Handshake). Meanwhile, LBPM is an abbreviation for "LFPS Based PWM Signaling Next, the LBPM signal is transmitted to the first link partner from the second link partner having received the signal (S83) (Handshake). Next, in order to perform a training sequence, a signal for TSEQ is transmitted to the second link partner from the first link partner having received the signal (S74). TSEQ is an abbreviation for "Training Sequence Equalizer". Next, in order to perform a training sequence, a signal for TSEQ is transmitted to the first link partner from the second link partner having received the signal (S84). Next, a first training sequence (TS1) is transmitted to the second link partner from the first link partner having received the signal (S75). Next, the first training sequence (TS1) is transmitted to the first link partner from the second link partner having received the signal (S85). Next, a second training sequence (TS2) is transmitted to the second link partner from the first link partner having received the signal (S76). Next, the second training sequence (TS2) is transmitted to the first link partner from the second link partner having received the signal (S86). Thereby, the first link partner is set to be in a state U0 (S4 in FIG. 2) by going through the Polling state (S3 in FIG. 2) (S77). Similarly, the second link partner is also set to be in a state U0 (S4 in FIG. 2) (S87).

FIG. 6 illustrates a detailed sequence in FIG. 7. When a Rx.Detect state transitions to a Polling state, a Polling.LFPS state (S61) is set first, and a handshake using the above-mentioned SCD1.LFPS signal is performed. Next, a Polling.LFPSPlus state (S62) is set, and a handshake using the above-mentioned SCD2.LFPS signal is performed.

Subsequently, a handshake of the above-mentioned LBPM is performed. In a Polling.PortMatch state (S63), two ports execute an LBPM handshake. A Polling.PortConfig state (S64) is a state in which the port sets itself in accordance with PHY Capability LBPM collated by Polling.Port-Match, and synchronization with a link partner is performed when a Polling.RxEQ state (S65) is set. In the Polling.RxEQ state (S65), a signal for TSEQ (TSEQ order set) for performing the above-mentioned training sequence is transmitted. When a Polling.Active state (S66) is set, a handshake of the first training sequence (TS1) is performed. When a Polling.Configuration state (S67) is set, a handshake of the second training sequence (TS2) is performed, and a Polling.Idle state (S68) is set and transitions to a state U0 (S617). Meanwhile, when a failure in a state transition occurs three times, the Polling.LFPS state (S61) transitions to an eSS.I-navtive state (S611) which is a link error state. When LFPS timeout occurs, the Polling.LFPS state (S61) can transition to a Compliance Mode state (S612). When timeout occurs between the ports or apparatuses in the Polling.Configuration state (S67), the state can transition to an Rx.Detect state (S613) or an eSS.Disabled state (S614) in which Enhanced SuperSpeed connection is invalidated. The Polling.Idle state (S68) can transition to a Hot Reset state (S615) or a loopback state (S616) in accordance with conditions.

A condition for normally transitioning to the U0 state (S4 in FIG. 2) is that a state (S617) exiting from a Polling state is set by two link partners succeeding in transmitting and receiving the SCD1.LFPS signal and the SCD2.LFPS signal to and from each other in the Polling.LFPS state (S61) and the Polling.LFPSPlus state (S62) in a period of 360 ms after the Rx.Detect state (S2 in FIG. 2) transitions to the Polling state (S3 in FIG. 3).

On the other hand, each of the components in the communication device 111 of the present embodiment can transition from a sleep state to an active state within 30 µs.

Thus, in the present embodiment, even when a first part of an LFPS signal transmission period after the Polling state transition is lost, the state can normally transition to an active state. Meanwhile, in a case where power is reduced every time an EI state is set, the LFPS signal transmission period after the Polling state transition is lost greatly, which results in a failure in the transmission and reception of the SCD1.LFPS signal and the SCD2.LFPS signal.

Meanwhile, an LFPS message can include Polling.LFPS and Ping.LFPS. Further, in a case where a link partner and a communication device are set to be in the U1 state (S5), Ping.LFPS can be transmitted at regular intervals.

When a Ping.LFPS signal is transmitted in the U1 state (S5) in the state transition diagram of the USB3.2 standard illustrated in FIG. 2, the communication device 111 of the present embodiment performs a linear operation in an active state, but this is not a problem because an LFPS signal transmission period is maintained. This will be described below. A period of an EI state between a Ping.LFPS signal transmission period and the next Ping.LFPS signal transmission period is a maximum of 240 ms. Thus, in the present embodiment, continuation of a no-signal state for 240 ms or more may be set as a condition of a transition from an active state to a sleep state. In this manner, the period of the U1 state (S5) can be maintained in an active state, the Ping.LFPS signal can be normally transmitted, and the Ping.LFPS signal transmission period is maintained. Meanwhile, in a case where power is reduced every time an EI state is set, the Ping.LFPS signal transmission period is a minimum of 40 ns, and thus a transition from a sleep state to an active state may not be in time.

In the present embodiment, a configuration in which the linear VGA 15 is provided at a stage after the linear TIA 14 has been adopted. The reason for this will be described below. When the linear VGA is not provided at a stage after the TIA, an amplitude of an output current signal of the TIA may vary greatly due to manufacturing variations in a laser diode and a photodiode and variations in optical coupling at the time of mounting, and conditions of an electric signal amplitude of the USB standard may not be satisfied. Thus, in order to satisfy the conditions of the electric signal amplitude of the USB standard in a case where the linear VGA is not provided at a stage after the TIA, it is necessary to adopt a limiting amplifier type TIA in which an amplitude of an output electrical signal is not affected by an amplitude of an input optical signal. However, in a case where the limiting amplifier type TIA is adopted, the above-mentioned problem occurs. Consequently, in the present embodiment, by adopting the linear TIA, providing the linear VGA at a stage after the linear TIA, and controlling a gain of the linear VGA, an amplitude of an output electric signal of the linear VGA satisfies conditions of an electric signal amplitude of the USB standard.

In the present embodiment, it is possible to execute offset cancellation during an EI period by adopting the linear TIA. This will be described below. A limiting amplifier type outputs only a logic level H and a logic level L and cannot output an intermediate level in an EI state, and thus a fixed value of the logic level H or a fixed value of the logic level L can only be output in an EI state. In order to execute offset cancellation in the TIA, information at a common level is required. However, in a case where a limiting amplifier type is adopted, a signal a common level cannot be transmitted, and thus offset cancellation cannot be executed. When offset cancellation cannot be executed in a period in an EI state, it is necessary to execute the offset cancellation again every time an LFPS signal is transmitted. When the offset cancellation is not performed appropriately, the duty of the LFPS signal may become inappropriate, a waveform of the LFPS signal is not normal, which may result in a failure in the establishment of communication. On the other hand, in the present embodiment, offset cancellation can be executed not only in an LFPS signal transmission period but also in a period in an EI state by adopting a linear amplifier type, and thus a waveform of a normal LFPS signal can be set at all times.

The communication device provided in the above-mentioned active optical cable includes the variable resistor 11 connected between differential input terminals of the linear laser driver 12, the transmitted signal detector 13 connected to the differential input terminals, the linear transimpedance amplifier 14 connected to the photodiode 113, the linear variable gain amplifier 15 connected to the output terminal of the linear transimpedance amplifier 14, the linear output driver 16 connected to the output terminal of the linear variable gain amplifier 15, the pulse counter 17 connected to the photodiode 113, the received signal detector 18 connected to the output terminal of the linear transimpedance amplifier 14, and the controller including a plurality of input terminals and a plurality of output terminals, the controller being configured such that the input terminals of the controller are connected to the output terminal of the pulse counter 17 and the output terminal of the received signal detector 18, and the output terminals of the controller are connected to the resistance value control terminal of the variable resistor 11, the control signal input terminal of the linear laser driver 12, the control signal input terminal of the linear transimpedance amplifier 14, and the control signal input terminal of the linear variable gain amplifier 15.

The above-mentioned communication device further includes the amplitude detector 19 connected to the output terminal of the linear variable gain amplifier 15.

In the above-mentioned communication device, the linear laser driver 12 can include the low speed driver 12A and the high speed driver 12B that are connected to a laser diode in parallel.

The above-mentioned terminal device includes the communication device, the laser diode 112 (or 122) connected to a transmission terminal of the communication device, and the photodiode 113 (or 123) connected to a reception terminal of the communication device.

An AOC includes the first optical fiber 131 which is optically coupled to the laser diode of the terminal device, and the second optical fiber 132 which is optically coupled to the photodiode 113.

As described above, the communication device 111 includes the controller 10, the differential input termination resistor 11, the linear laser driver 12, the transmitted signal detector 13, the linear transimpedance amplifier (linear TIA) 14, the linear variable gain amplifier (linear VGA) 15, the linear output driver 16, the pulse counter 17, the received signal detector 18, and the amplitude detector 19. The controller 10 outputs a Term signal for setting a resistance value of the differential input termination resistor 11, a TxEN signal and an LS signal for controlling an operation of the linear laser driver 12, an RxEN signal for controlling the linear TIA 14, the linear VGA 15, and the linear output driver 16, and a GCTL signal for controlling a gain of the linear VGA 15. A configuration of the communication device 121 is the same as a configuration of the communication device 111.

Although the description of the embodiment so far has been based on the USB standard, the present invention is not limited to coping with the USB standard.

What is claimed is:

1. A communication device which is provided on a first terminal side or a second terminal side in an active optical cable configured to perform communication between the first terminal side and the second terminal side by using a laser diode and a photodiode respectively provided on the first terminal side and the second terminal side, the communication device comprising:
    a differential input termination resistor configured to terminate a differential input terminals to which a signal to be transmitted to the other party communication device side is input as differential signals, and has a variable resistance value;
    a linear laser driver configured to supply a current signal to the laser diode based on a signal to be transmitted to the other party communication device side and output an optical signal from the laser diode;
    a transmitted signal detector configured to detect whether or not an input signal for the differential input terminals is an electrical idle;
    a linear transimpedance amplifier configured to input a current signal output from a photodiode having received an optical signal having arrived from the other party communication device side, convert the current signal into a voltage signal, and output the voltage signal;
    a linear variable gain amplifier configured to amplify and outputs the voltage signal output from the linear transimpedance amplifier;
    a linear output driver configured to output the voltage signal output from the linear variable gain amplifier to an output destination device and is able to detect an input termination resistance of the output destination device;
    a pulse counter configured to monitor the current signal output from the photodiode or the voltage signal output from the linear transimpedance amplifier, and detect the number of pulses of the current signal or the voltage signal;
    a received signal detector configured to monitor the current signal output from the photodiode or the voltage signal output from the linear transimpedance amplifier, and detect whether or not the current signal or the voltage signal is an electrical idle; and
    a controller configured to control a transition between an active state in which a signal is able to be transmitted and a sleep state in which power consumption is able to be reduced, based on an electrical idle detection result obtained by the transmitted signal detector, an output destination device input termination resistance detection result obtained by the linear output driver, a pulse number detection result obtained by the pulse counter, and an electrical idle detection result obtained by the received signal detector, and control operations of the differential input termination resistor, the linear laser driver, the linear transimpedance amplifier, the linear variable gain amplifier, and the linear output driver,
    wherein the controller
        determines a transition from a sleep state to an active state when the transmitted signal detector has detected that the input signal is not an electrical idle or when the number of pulses detected by the pulse counter indicates a transition from the sleep state to the active state,
        determines a transition from the active state to the sleep state, based on a fact that the transmitted signal detector has detected that the input signal is an electrical idle or a fact that the received signal detector has detected that the current signal or the voltage signal is an electrical idle, controls supply of the current signal to the laser diode by the linear laser driver, based on the output destination device input termination resistance detection result obtained by the linear output driver, and whether it is the active state or the sleep state, controls a resistance value of the differential input termination resistor based on the pulse number detection result obtained by the pulse counter, and controls operations of the linear transimpedance amplifier, the linear variable gain amplifier, and the linear output driver, based on whether being in the active state or the sleep state.

2. The communication device according to claim 1, further comprising:

an amplitude detector configured to detect an amplitude of the voltage signal output from the linear variable gain amplifier, wherein the controller controls a gain of the linear variable gain amplifier based on an amplitude detection result obtained by the amplitude detector.

3. The communication device according to claim 1, wherein the linear laser driver comprises:

a low speed driver; and a high speed driver, wherein the low speed driver supplies a current signal to the laser diode based on a control signal received from the controller; and wherein the high speed driver supplies a current signal to the laser diode based on an input signal for the differential input terminals; and wherein the controller controls supply of the current signal to the laser diode by the low speed driver, based on the output destination device input termination resistance detection result obtained by the linear output driver and whether it is the active state or the sleep state, and controls supply of the current signal to the laser diode by the high speed driver, based on whether it is the active state or the sleep state.

4. The communication device according to claim 1, wherein the controller makes the number of pulses of the current signal to be supplied from the linear laser driver to the laser diode vary in a case where the output destination device input termination resistance detection result obtained by the linear output driver is a high impedance, in a case where the output destination device input termination resistance detection result obtained by the linear output driver is a low impedance, and in a case where a transition from the sleep state to the active state is performed.

5. The communication device according to claim 1, wherein the controller determines a transition from the active state to the sleep state when the transmitted signal detector has detected that the input signal is an electrical idle over a fixed period or when the received signal detector has detected that the current signal or the voltage signal is an electrical idle over a fixed period.

6. The communication device according to claim 5, wherein a length of the fixed period is 240 ms or more.

7. A terminal device comprising:

the communication device according to claim 1;

a laser diode configured to:

input a current signal supplied from a linear laser driver of the communication device, and output an optical signal to the other party communication device side; and a photodiode configured to:

receive an optical signal having arrived from the other party communication device side, and output a current signal to a linear transimpedance amplifier of the communication device.

8. An active optical cable comprising:

a first terminal device and a second terminal device each of which has a structure of the terminal device according to claim 7;

a first optical fiber configured to guide an optical signal output from a laser diode of the first terminal device to a photodiode of the second terminal device; and a second optical fiber configured to guide an optical signal output from a laser diode of the second terminal device to a photodiode of the first terminal device.

* * * * *